No. 860,684.  
PATENTED JULY 23, 1907.  
H. C. MONTGOMERY.  
VALVE.  
APPLICATION FILED JULY 19, 1906.
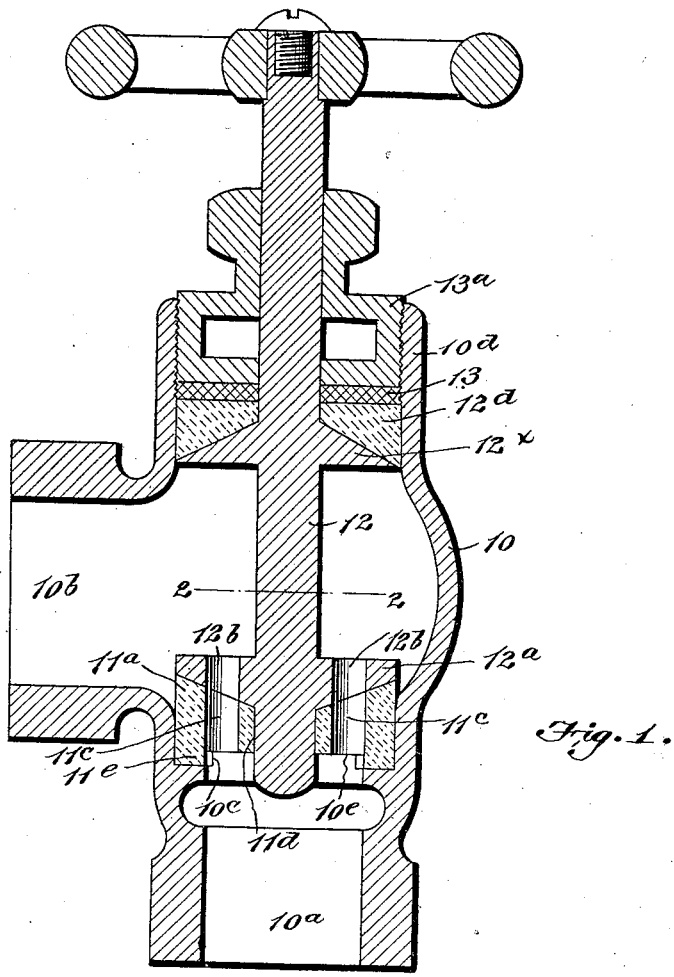
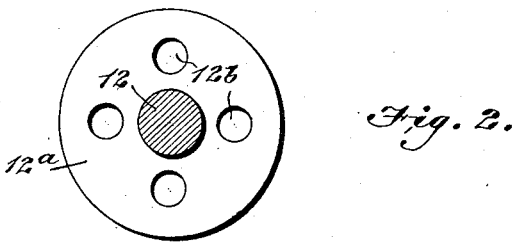
Henry C. Montgomery, Inventor
Witnesses  
M. A. Schmidt  
G. E. Few
By Milo B. Stevens & Co.  
Attorneys

UNITED STATES PATENT OFFICE.

HENRY C. MONTGOMERY, OF CHICAGO, ILLINOIS.

VALVE.

No. 860,684.  Specification of Letters Patent.  Patented July 23, 1907.

Application filed July 19, 1906. Serial No. 326,873.

*To all whom it may concern:*

Be it known that I, HENRY C. MONTGOMERY, a citizen of the United States, residing at Chicago, in the county of Cook and State of Illinois, have invented new and useful Improvements in Valves, of which the following is a specification.

This invention is a valve adapted for steam and water pipes, cocks and faucets, and also especially suitable for steam radiators.

The object of the invention is to provide an improved quick opening valve. This valve may be opened or closed with very small movement, and it is so constructed that the parts can be readily removed or replaced. The valve seat, especially, can be easily replaced, as will more fully hereinafter appear.

The invention is illustrated in the accompanying drawings, in which

Figure 1 is a longitudinal section and Fig. 2 is a sectional view on the line 2—2 of Fig. 1.

Referring specifically to the drawings, 10 indicates the angular valve casing, having an inlet $10^a$ and an outlet $10^b$ and a neck $10^d$ through which the valve stem extends. The neck is large enough to allow the passage of the valve disk and seat therethrough.

The valve seat consists of a disk $11^a$ which sets on a shoulder $10^c$ in the inlet branch, and said disk has lugs $11^e$ which fit in notches $10^e$ in said shoulder so that it cannot turn. The valve seat is held in place by the pressure of the valve stem and its disk. Said seat has a central circular hole $11^d$ and a circular row of holes $11^c$ around the same.

The valve stem is indicated at 12 and it projects at its lower end through the central hole $11^d$ in the valve seat and has an outwardly-extending circular disk or flange $12^a$ which is provided with holes $12^b$ adapted to register with the holes $11^c$ of the valve seat. The upper face of the valve seat is conically depressed or ground and the meeting face of the valve disk $12^a$ is accordingly ground to the same angle, to fit within the depression.

Near its upper end the valve stem has a circular conical disk $12^x$ which fits against a ring $12^d$ having a conical depression, and fitting within the neck $10^d$, and above said disk the stem passes through a packing washer 13, and all parts are held down by a screw plug $13^a$ which screws in the threaded upper end of the neck, against the washer. The plug holds the valve stem down and the valve disk holds the seat in place, and by manipulating the nut the valve can be loosened or tightened as desired. By removing the nut the valve stem and disk can be pulled out and the valve seat piece lifted out. Since the seat is not an integral part of the casing, this makes repairs thereof easy and inexpensive.

The valve is opened or closed by turning the stem which throws the holes $11^c$ and $12^b$ in or out of register and consequently opens or closes the valve. When four holes are provided, as shown, the valve will open or close, full, by a one-eighth turn, which makes a very quick action.

The valve seat $11^a$ and ring $12^d$ are preferably made of non-corrosive, non-metallic self lubricating material, such as a composition of black lead and fullers' earth, molded to proper shape. The conical parts described prevent leak and obviate the use of a stuffing box.

I claim:

1. A valve comprising a casing having a neck, a detachable seat therein opposite the neck, a turning stem extending through the neck and seat and having a valve disk bearing against the seat and a conical disk within the neck, said seat and valve disk having openings which may be registered, a ring within the neck, having a conical depression in which said conical disk fits, and a plug screwed into the neck against the ring therein, the neck being of sufficient size to allow the passage of the valve disk and seat therethrough, when the plug is removed.

2. A valve comprising a casing having therein a valve seat with a conical depression and a central bearing and an opposite ring with a conical depression, and a valve stem extending through the ring and fitting at its inner end in said bearing and having oppositely disposed conical disks fitting respectively against the seat and the ring.

3. A valve comprising a casing having therein a valve seat and an opposite ring, said seat and ring being made of a composition of black lead and fullers' earth, and a valve stem having oppositely disposed disks bearing against said seat and ring.

In testimony whereof I have signed my name to this specification in the presence of two subscribing witnesses.

HENRY C. MONTGOMERY.

Witnesses:
SIGNA FELTSKOG,
H. G. BATCHELOR.